No. 613,201. Patented Oct. 25, 1898.
W. B. HOPKINS.
TYPE WRITING MACHINE.
(Application filed May 1, 1897.)
(No Model.) 9 Sheets—Sheet 6.
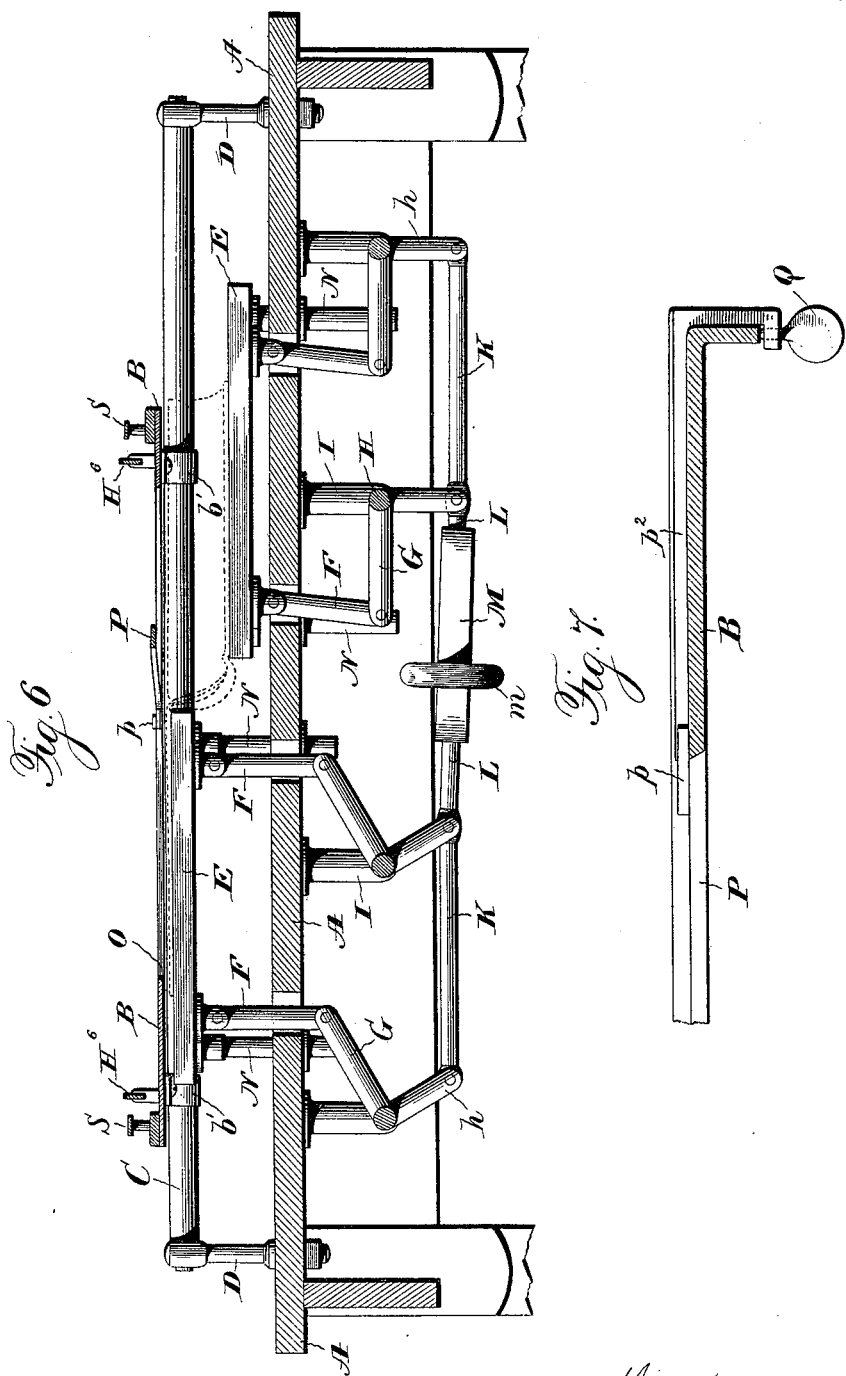

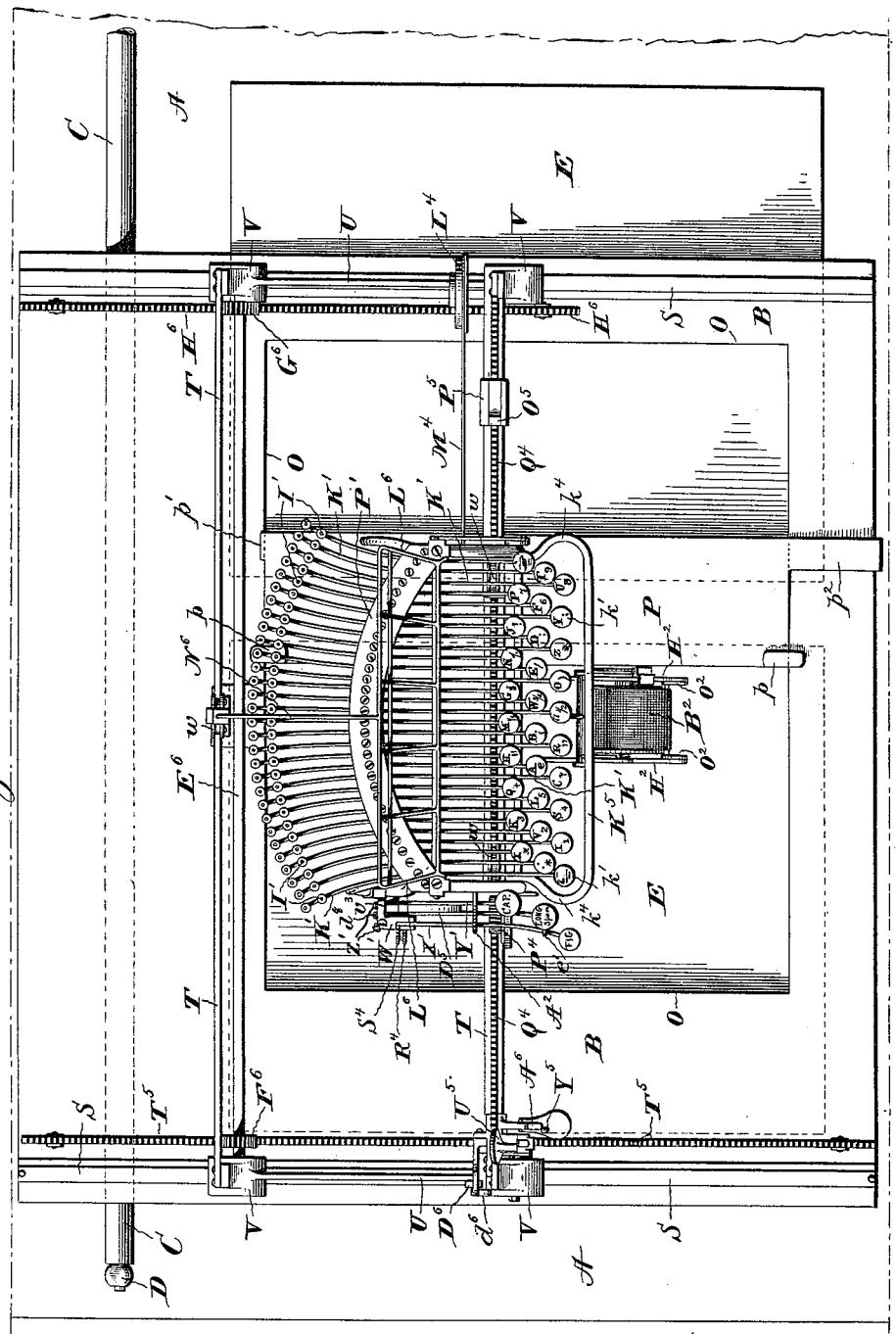

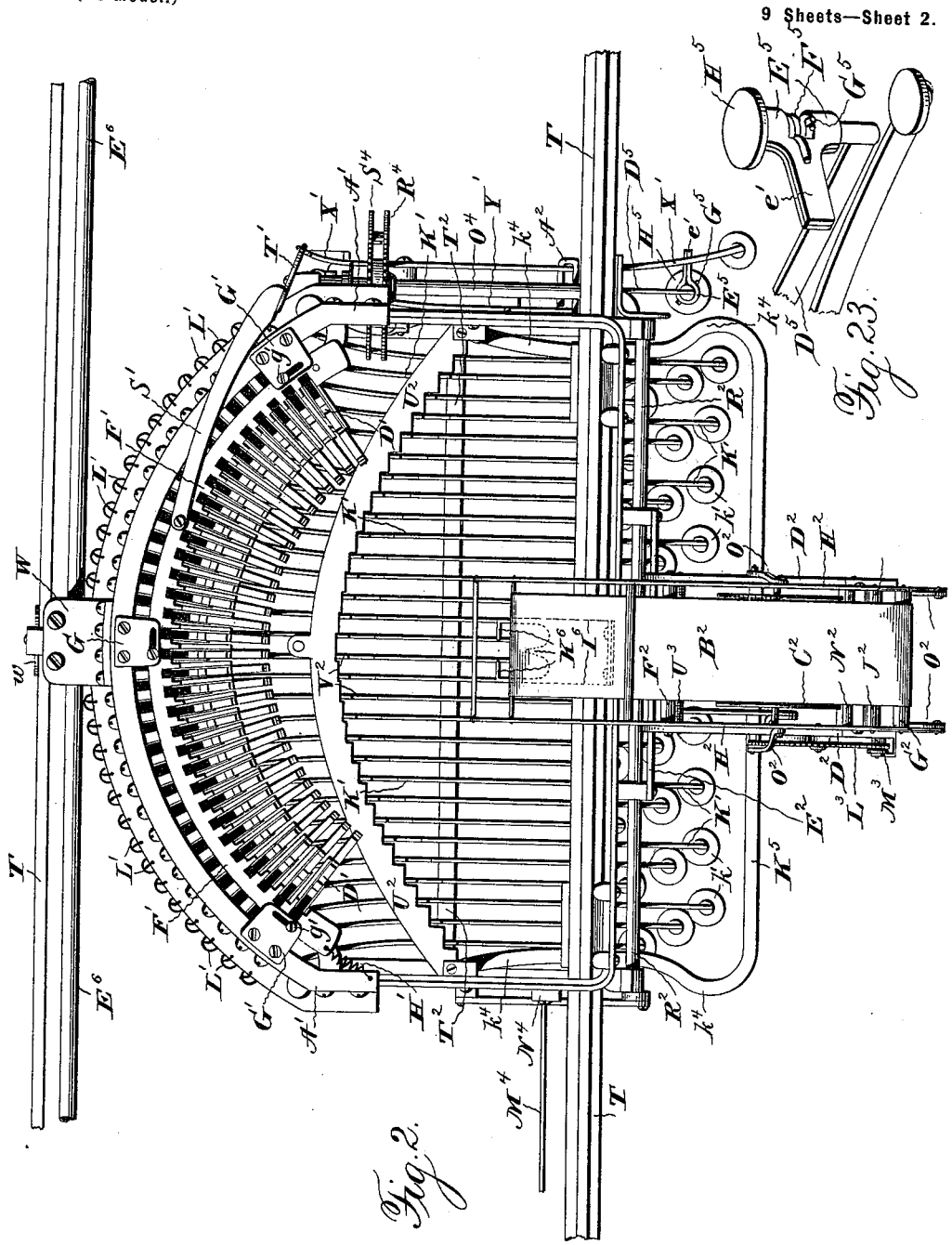

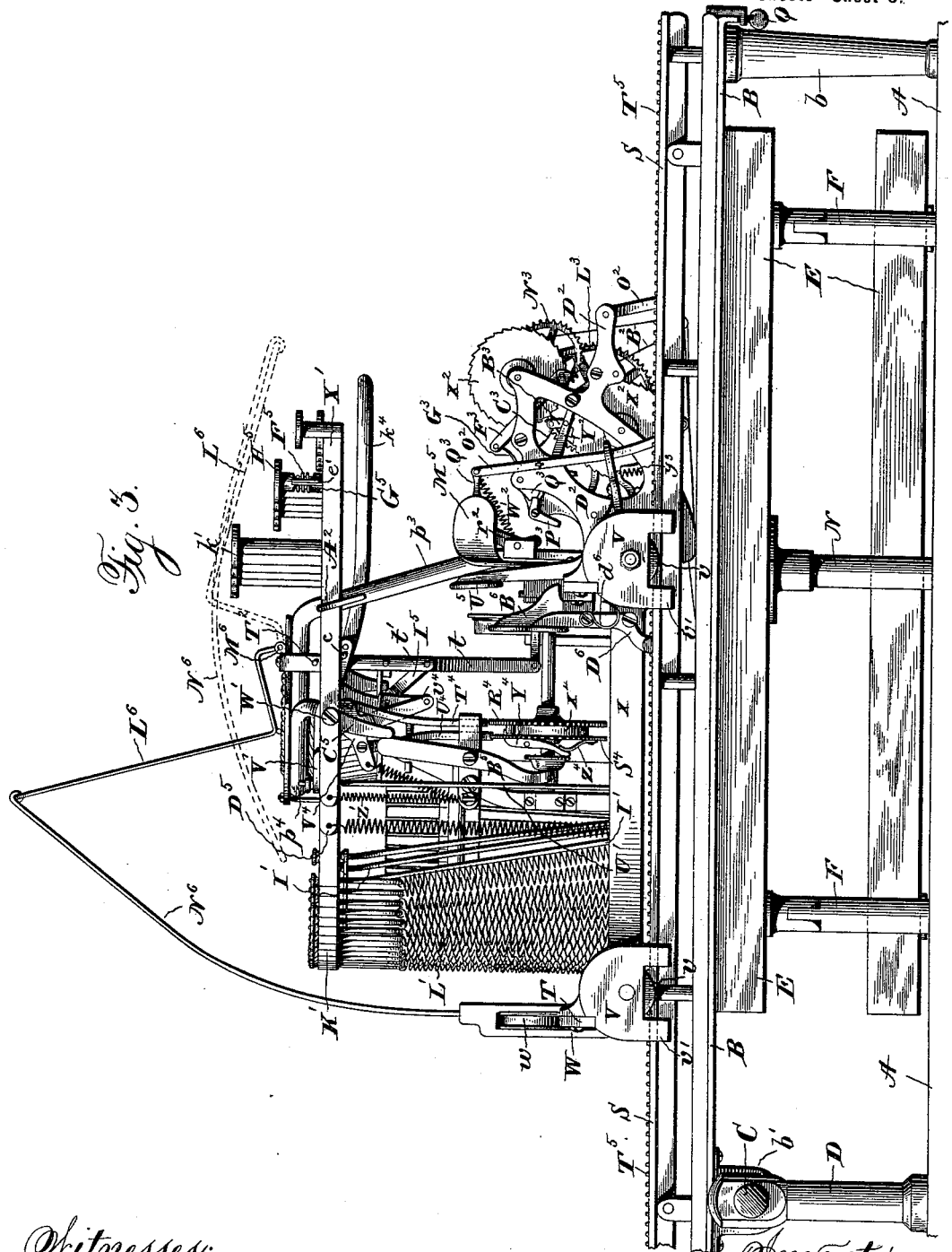

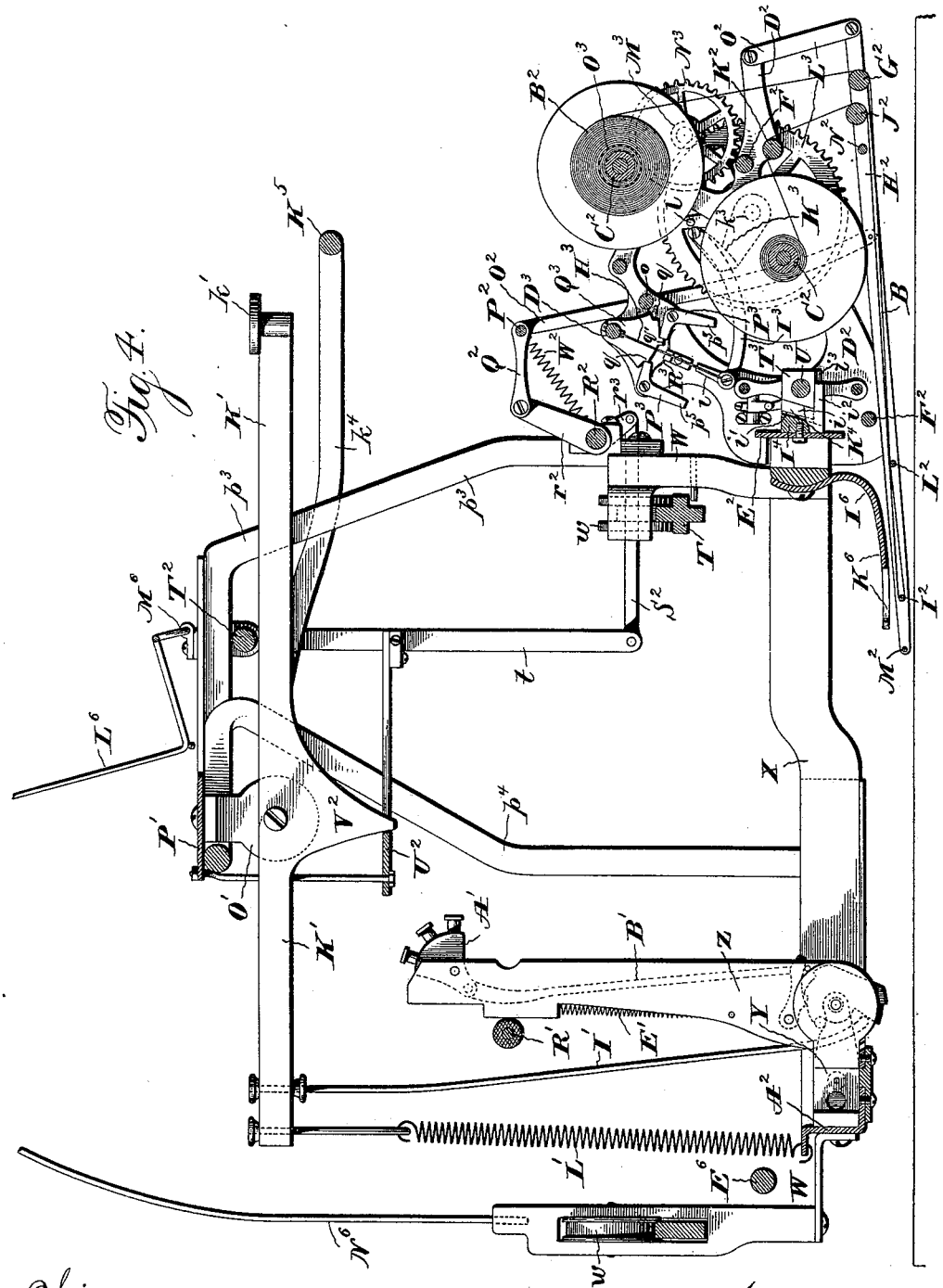

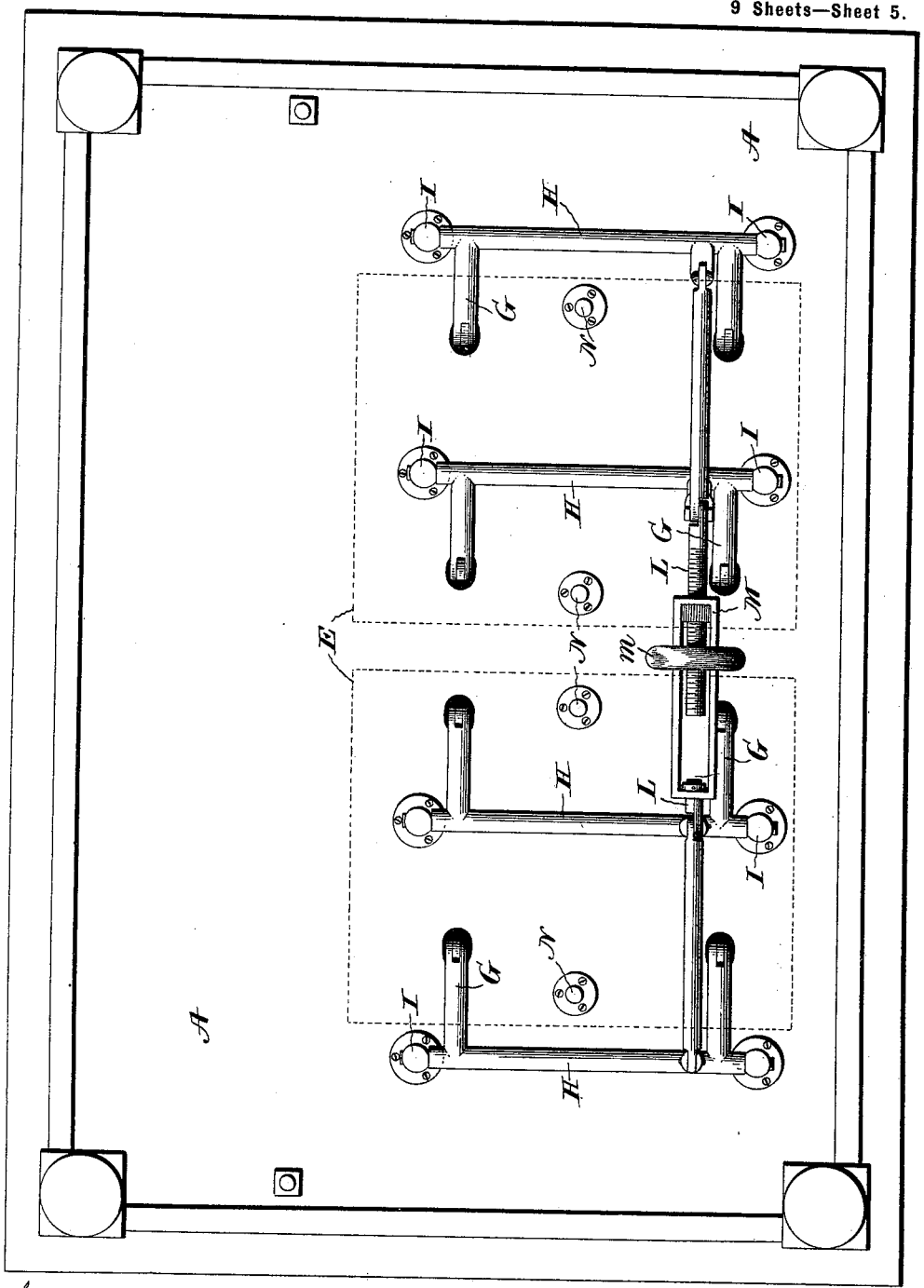

No. 613,201. Patented Oct. 25, 1898.
W. B. HOPKINS.
TYPE WRITING MACHINE.
(Application filed May 1, 1897.)
(No Model.) 9 Sheets—Sheet 7.
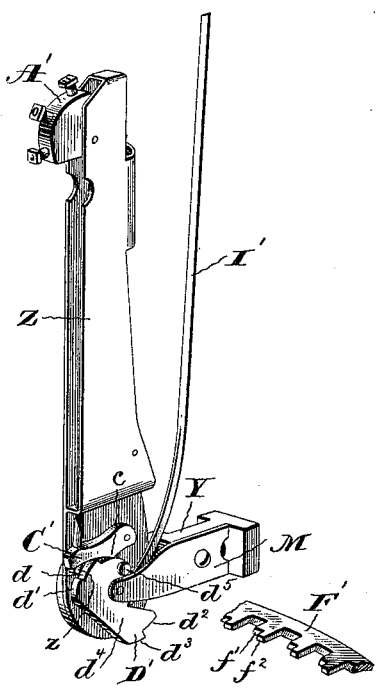
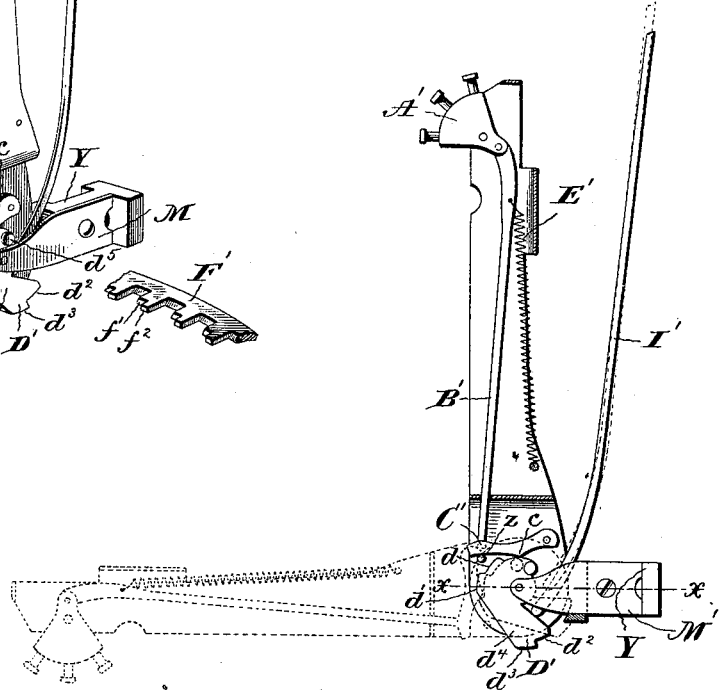
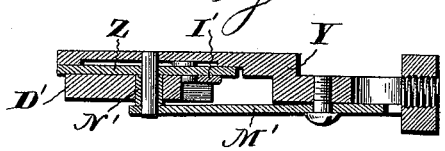
Witnesses:
Jas E. Hutchinson.
Frank S. Prindle.
Inventor.
William B. Hopkins
by Prindle & Russell
his Attorneys

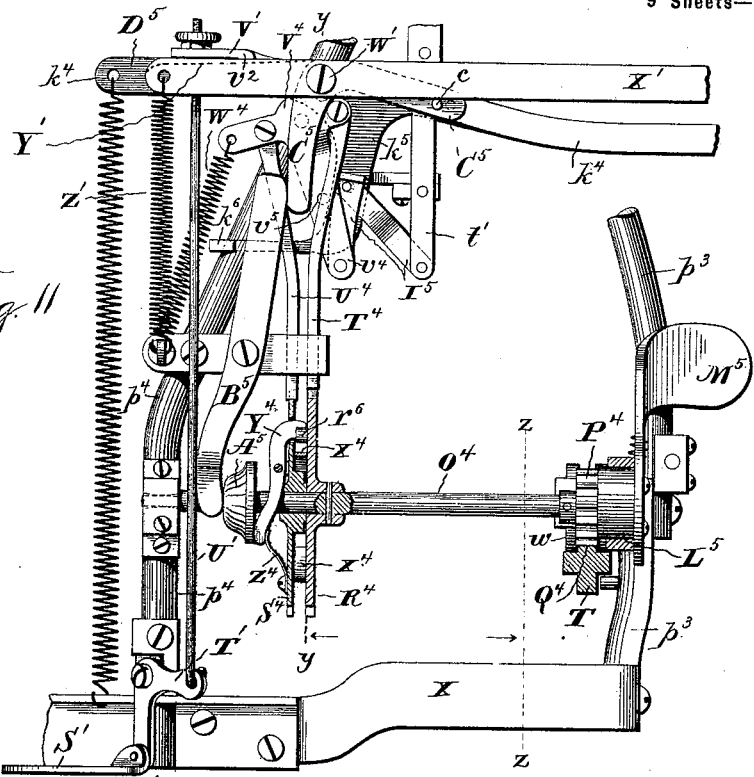
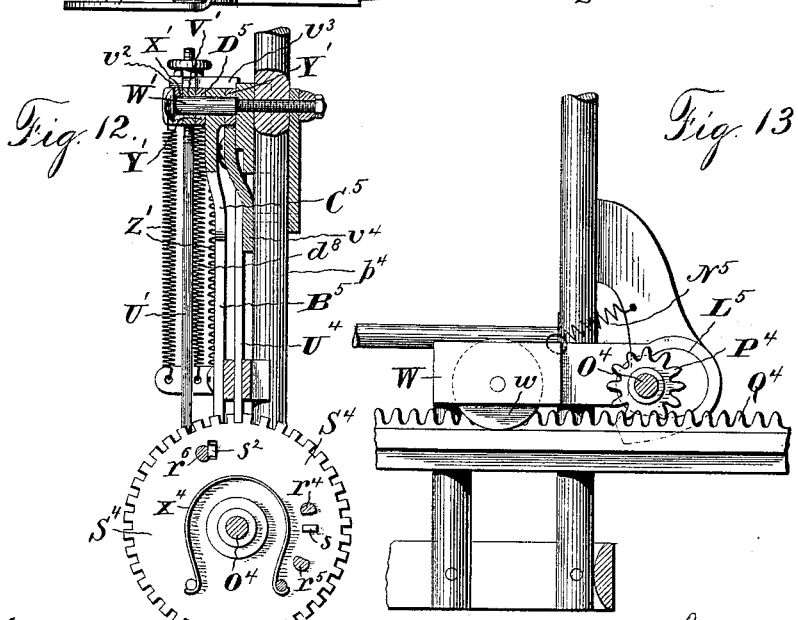

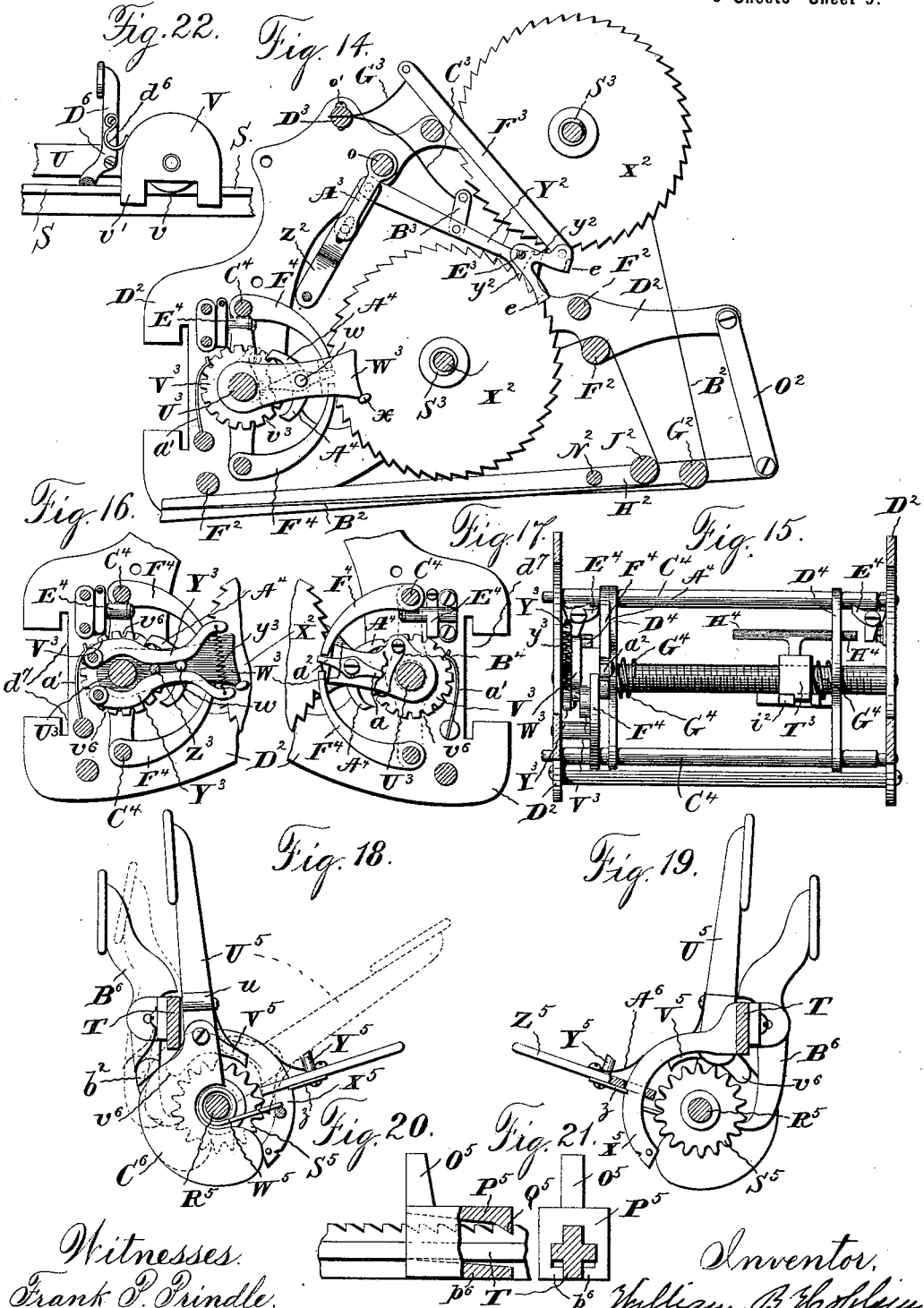

UNITED STATES PATENT OFFICE.

WILLIAM B. HOPKINS, OF BIRMINGHAM, ALABAMA.

TYPE-WRITING MACHINE.

SPECIFICATION forming part of Letters Patent No. 613,201, dated October 25, 1898.

Application filed May 1, 1897. Serial No. 634,746. (No model.)

*To all whom it may concern:*

Be it known that I, WILLIAM B. HOPKINS, of Birmingham, in the county of Jefferson, and in the State of Alabama, have invented certain new and useful Improvements in Type-Writers; and I do hereby declare that the following is a full, clear, and exact description thereof, reference being had to the accompanying drawings, in which—

Figure 1 is a top plan of the entire organization; Fig. 2, a bottom plan of type-writer mechanism only; Fig. 3, a side elevation of what is shown in Fig. 1; Fig. 4, a vertical central section from front to rear, with parts omitted for sake of clearness; Fig. 5, a bottom plan view of the connections between the two book supports or platforms; Fig. 6, a vertical section of the same from side to side; Fig. 7, a detail view in section of adjustable side of the leaf-engaging plate; Fig. 8, a perspective view of one of the letter-carrying arms and a portion of the notched segment; Fig. 9, a side elevation thereof, partly in section, with dotted lines showing the printing position when printing from the middle letter; Fig. 10, a section on line $x\,x$ of Fig. 9; Fig. 11, a detail section on a vertical plane cutting axially through the shaft of the lateral feed-controlling mechanism and showing the three special keys and the spacer with their connections; Fig. 12, a section on line $y\,y$ of Fig. 11; Fig. 13, a section on line $z\,z$ of Fig. 11; Fig. 14, a detail view in section of the ribbon-feed mechanism on a vertical plane cutting between the ratchet-wheels and the side of the frame and looking toward the wheels; Fig. 15, a detail transverse section of same on line passing parallel with worm-shaft; Figs. 16 and 17, detail views of sections looking from opposite sides of the mechanism for producing the lateral feed of the inking-ribbon; Figs. 18 and 19, detail views of sections, taken on opposite sides of the pawl mechanism of the feed device for line-spacing; Figs. 20 and 21, detail views of the adjustable stop device for fixing the length of the line to be printed. Fig. 22 is a detail side view of the rail or bar engaging friction-dog; Fig. 23, a detail view showing the coupling device for connecting two key-levers.

The object of my invention is to provide an improved type-writer which, besides having features of construction that render it applicable to general use, will be especially fitted for printing upon the pages of books; and to these ends and others to be set forth hereinafter the said invention consists in the construction and combination of parts, substantially as hereinafter specified.

In the carrying of my invention into practice I mount my mechanism upon a table A, the type-writer (of a construction to be described later) being supported above the top of the latter upon a rectangular metal plate B, that at the front, near each side, has attached a leg $b$, which rests on the table-top, and at the rear rests upon a horizontal rod C, to which it is slidingly and pivotally connected, as by eyes $b'$ and $b'$, said rod being supported at its extremities by standards or posts D and D, fastened firmly to the top of table A.

The sliding connection between the plate B and the rod is to enable the tpye-writer to be shifted sidewise from one page of a book placed beneath the plate to the other, and the pivotal connection with said rod is to permit the placing of a book in and its removal from position beneath the plate.

The book to be printed upon is not laid upon the top of table A, but upon a rest or support of peculiar construction. Said support is composed of two like vertically-movable rectangular-shaped platforms E and E, placed side by side beneath the plate B, that receive each one side of an open book and are connected together by a system of levers to be described, so that the vertical movement of one will automatically result in a corresponding vertical movement of the other, but in an opposite direction.

Upon the turning of the leaves of the book, so that they are transferred from one platform to the other, the platform receiving them will be lowered and the one from which they are removed will be raised by an amount equal to the thickness of such leaves, and hence the open or exposed pages on both of the platforms will have their surfaces in the same horizontal plane and the surface to be printed on be always at the proper height, whatever the thickness of book beneath.

Each platform E has pivotally connected to and projecting downward from its bottom near each of its four corners a rod or post F, which passes through an opening in the top of table A and beneath said top is pivotally connected to a crank-arm G, that projects radially from a rock-shaft H, which is journaled at its ends in bearings formed in posts I and I, secured to and projecting downward from the under side of the table-top.

There are two rock-shafts H and H for each platform, and the same are connected together to move in unison by a pitman or link K, pivotally connected to crank-arms $h\ h$, projecting from the respective shafts.

The crank-arms $h$ and $h$ of the two rock-shafts of the two platforms that are nearest are connected together, so that the movement of one platform will be transmitted to the other, as above described. To secure the opposite movement of the two platforms—that is, the ascent of the one when the other descends—it is of course necessary that the crank-arms G and G of the rock-shaft of one platform shall extend in a direction opposite that of the crank-arms of the shafts of the other platform.

To provide for the use of books of different thickness, the platforms E and E must be capable of vertical adjustment, and to effect this adjustment I make the connection between the adjacent rock-shafts of the two platforms an adjustable one, so as to permit an increase or decrease in its length, and thus raise or lower the level of the platforms. A very simple and convenient construction for this purpose is shown, which consists of two rods or bars L and L, connected, respectively, to the crank-arms $h$ and $h$ of the adjacent shafts of the two platforms and themselves connected by a turnbuckle M, one of said rods having a swiveled connection with one end of the turnbuckle and the other being screw-threaded to engage a threaded opening in the other end of said turnbuckle. The turnbuckle is provided with a hand-wheel $m$, by means of which it may be conveniently revolved.

The two platforms E and E are steadied and guided in their vertical movements by being provided each on its bottom, near its side edges, with downwardly-extending rods or posts N and N, that respectively pass through guide-openings in the top of the table A.

The metal type-writer-supporting plate B is provided with a large opening O, of a size to expose the largest page on which the machine is intended to work; but its dimensions are such that the side edges at least of the leaf being printed on will be engaged by its edges and the leaf thus held flat and smooth.

For printing upon books with smaller-sized leaves provision is made for holding the edges of the leaf by contracting the width of the opening, such being accomplished by employing a sliding strip P, whose ends respectively engage and are guided by the back and front edges of the plate-opening. The inner leaf-engaging edge of such strip is placed so that its bottom is in the same plane as the bottom of the plate B, and on its upper side, at such point, it is provided at each end with a lug $p$, that overhangs the top of the plate to hold it from dropping, while to prevent the strip from rising each end edge is beveled downward and outward and the adjacent surface of the plate B is correspondingly shaped. On its rear end, at its outer side, the strip P has a lug or projection $p'$ to rest upon the top of the plate B, and on its front end, at the outer side, it has a forward extension $p^2$, that passes slightly beyond the front edge of the plate B and is then carried downward and under the latter, where a set-screw Q is tapped through it, that impinges against the plate and serves to secure the strip P in the desired place of adjustment.

At each side the plate B has extending from front to rear a bar or rail S, that is supported upon short studs or posts above its upper surface, and upon the same is mounted a rectangular frame composed of a front and a rear bar T and T and two end bars U and U, to which the former are connected, each of the bars U and U being provided at its extremity with a box or housing V, containing a suitably-journaled wheel or roller $v$, that rests upon the rail or bar S. On its opposite sides each box or housing V has portions $v'$, that extend downward alongside of said rail S and are then carried inward beneath the same in position to engage the under side thereof should there be any upward or outward tendency of the frame away from the rail.

The rear bar T is of simple flat shape or rectangular in cross-section; but the front bar T is made $+$-shaped in cross-section for strength and rigidity. Supported from said bars by hangers W, W, and W, one for the rear and two for the front bar, is an open frame X, composed of a straight front part lying parallel with the front bar T and a rearwardly-extending part that for a short distance from each end of the front part is straight and then is curved in the arc of a circle. Said frame X is thus substantially semicircular in shape. Each of the hangers W journals a grooved or flanged roller or wheel $w$, that in the case of each front hanger rests upon the side flanges of the bar T, straddling the top flange, and in the case of the rear hanger rests on the top edge of the bar. A stud or pin projecting from each front hanger, beneath the adjacent horizontal flange of the front bar T, prevents upward disengagement of the hanger from the bar, and a portion of the rear hanger beneath the rear bar T serves a like purpose for the rear hanger.

Secured by screws or otherwise to the inner side of the curved portion of the frame X is a series of horizontal radially-arranged brackets Y and Y, to each of which is pivoted a type-arm Z. The type-arm when not in printing position stands upright or vertical, its lower end in such position being the place of pivotal connection with the bracket and the type being placed at the upper end. In printing the arm swings from a vertical to a horizontal position, and as the pivot is close to the surface to be printed on a good fair impact of the type thereon is obtainable.

Each type-arm is made of two parallel pieces of sheet metal separated by a small space, one of which terminates short of the arm-pivot and is there secured to the side of the other, and the two are also connected at their upper ends and rear edges.

A plurality of type, preferably three, are carried by each type-arm, and they are mounted equidistant apart on the periphery of a quadrant-shaped head $A'$, that is pivoted to the arm in the space between the two pieces thereof. Pivotally connected to said head and extending therefrom between the arm side pieces toward the arm-pivot is a rod $B'$, that at its inner end engages a lever $C'$, pivoted to the longer piece of the arm and constructed to coöperate with a cam $D'$, pivoted concentrically with the arm, to cause rotation of the head $A'$ to bring certain of the type into position to print. Said cam has two peripheral projections $d$ and $d'$, that are different distances from its center in a radial direction and are adapted to be placed and held in the path of a projection $c$ on the lever $C'$ as the latter moves with the type-arm and said lever and thus the type-head moved.

A coiled spring $E'$, fixed at one end to a pin on the type-arm and connected at the other end to the rod $B'$, serves to swing the type-head in the opposite direction to that caused by the cam $D'$ and to normally hold the head, so that an end one of the series of type will be in position to print. A pin or stud $z$, projecting from the arm $Z$ in the path of the lever $C'$, engages the latter to limit the movement of the head by said spring.

In the swinging of the type-arm to print the cam travels with it by reason of the engagement of the lever $C'$ with the shorter projection $d$, and unless the cam is stopped before the limit of movement of the type-arm is reached there will be no relative movement of said lever and cam, and hence no turning of the type-head on its pivot. If the cam is stopped and held at such a point in its movement that the lever $C'$ will ride over the shorter projection $d$ in completing its movement, then the type-head will be rocked to present the second type to printing position, and if it be stopped earlier in its movement with the type-arm, so that the lever $C'$ will ride over the higher projection $d'$, then the type-head will be rocked to present the third type to printing position.

To stop and hold the cam, it is provided with two shoulders $d^2$ and $d^3$ on an arm $d^4$, that are different distances radially from the cam-pivot and are adapted to be respectively engaged by shorter and longer projections $f'$ and $f^2$ from a segment-shaped bar $F'$, placed below the series of brackets $Y$ and supported on several horizontal plates $G'$ and $G'$, that are fastened to the bottom of the curved part of the frame $X$.

The bar $F'$ is slidingly mounted on the plates $G'$ and $G'$, with which it is connected by a headed screw $g'$ for each plate, the screw passing through an opening that is elongated to permit the sliding movement of the bar. By such movement of the bar and according to the amount thereof one projection or the other is interposed in the path of a shoulder of the cam. Said bar $F'$ is notched or cut away to permit the free passage of the cam when its movement is not to be checked, as when the position of the head is not to be changed.

Two levers, to be hereinafter described, are provided to impart the desired amounts of movement to the segment-bar $F'$, and a coiled spring $H'$, connected to one end of said bar and to an adjacent part of the frame $X$, restores the bar to normal position after being moved by said levers, said bar being provided with a suitable stop to arrest it at normal position.

It will of course be understood that the one bar $F'$ is provided with projections and notches for all of the type-arm cams.

A rod or wire $I'$, connected at its lower end to the type-arm quite close to its pivot and at its upper end to the rear end of a pivoted key-lever $K'$, serves to transmit movement of the latter to the type-arm, the raising of the rear end of the key-lever by pressure of the finger on its front end serving to swing the type-arm to cause it to print, and the lowering of said rear end under pull of a coiled spring $L'$ operating to restore the type-arm to position out of use, the said spring $L'$ being attached at its upper end to the rear end of the key-lever and at its lower end to the curved part of the frame $X$.

I utilize the lower end of the rod $I'$ that is attached to the type-arm to strike the arm $d^4$ of the cam $D'$ as the type-arm returns to vertical position, so as to return the cam to the position from which it is moved by the movement of the type-arm to printing position. A lateral offset or lug $d^5$ on the cam $D'$ by engaging one side of the bracket $Y$ on this return movement of the cam limits the travel of the latter due to the engagement of the rod end.

One side of the bracket $Y$ is a rigid bar; but the other side is composed of a thin spring-plate $M'$, sufficiently stiff to hold or support the type-arm against sidewise tendency, but adapted to yield when lateral pressure is applied to the type-arm—as, for example, when two arms are simultaneously moved to print and come into contact. The yielding of the spring under a circumstance like this will prevent the interlocking of the arms and obviate any danger of the same being bent.

As the cam $D'$ is interposed between the type-arm and the spring-plate, I avoid having the latter press against the cam and cause it to press against the type-arm by placing a sleeve or tube N' around the type-arm pivot, between said arm and the spring-plate, which sleeve is longer than the cam is thick and on which the latter is pivoted. Thus no pressure is applied to the cam by the spring to restrict its free movement, and the pressure of the spring is exerted against the side of the type-arm.

Each key-lever K' is pivoted at a point intermediate its ends to a bracket O', that depends from the under side of a curved crossbar P', that is supported at its extremities by two bars $p^3$ and $p^4$ at each side of the machine, that are attached to and rise respectively from the side of the frame X and one of the front hangers W. At its front end each key-lever is provided with a suitable finger-engaging head or button $k'$, upon which the appropriate type characters are marked. Preferably the connections between each key-lever and the rod I' and the spring L' are adjustable in a well-known way, as shown, to provide for customary adjustments.

A rubber or cloth covered bar R', attached to the two side bars $p^4$ and $p^4$ and placed at the rear of the type-arms, in position to be engaged thereby when retracted from printing position, serves as a cushioned or yielding stop for them.

For sliding the segment-bar F' to coöperate with the cams D' there is attached to the under side of the same a link or bar S', which is pivotally connected to one arm of a bell-crank lever T', that is pivoted to the bar $p^4$, that preferably is at the left side of the machine, the other arm of the bell-crank lever being connected by a vertically-extending rod U' with the rear end of a lever V', that is pivoted to a horizontal stud W', that projects from the bar $p^4$ near its upper end. Pivoted on said stud W', on opposite sides of the lever V', are two levers X' and Y', that respectively at their rear ends are adapted to engage lugs $v^2$ and $v^3$, projecting horizontally on opposite sides of the lever V'. The lever X' is in engagement with its lug $v^2$ through all of its movement and serves to move the bar F' the entire amount of its possible movement, while for a portion of the movement of the lever Y' it does not have contact with its lug $v^3$, and hence the bar F' is moved by it the shorter amount of its movement, the top edge of said lever Y' being, as shown by dotted lines, Fig. 11, below the under side of said lug. Said levers X' and Y' are extended to the front of the machine, where, like the levers K', they are provided with suitable heads, and to each at its rear end is attached a coiled spring Z' to pull it in the opposite direction to that when pressed by the finger. The levers X' and Y' are limited in their movement in opposite directions by two horizontal rods $A^2$ and $A^2$, arranged, respectively, above and below them and attached to the nearer bar $p^4$.

The ink for printing I supply from a ribbon $B^2$, that is connected at its ends to two spools $C^2$ and $C^2$, that are journaled between the two side plates $D^2$ and $D^2$ of a frame that is mounted on a bar $E^2$, fastened to the front side of the straight part of the frame X, each plate having a T-shaped slot $d^7$ (see Figs. 16 and 17) that engages the latter. Cross-bars $F^2$ and $F^2$ connect the two side plates $D^2$ and $D^2$. From one spool $C^2$ the ribbon descends to and over a roller $G^2$, mounted between two light parallel horizontal bars $H^2$ and $H^2$, that extend inward beneath the front part of the frame X, and from said roller $G^2$ the ribbon passes horizontally inward to and over a roller $I^2$, mounted between the inner ends of the bars $H^2$ and $H^2$, then doubling on itself passes over a third roller $J^2$, placed a short distance in rear of the first roller $G^2$, and, finally, over a fourth roller $K^2$ above the roller $J^2$ to the second spool $C^2$.

Between the rollers $G^2$ and $I^2$ and nearer the latter a roller $L^2$ is provided as an intermediate support for the ribbon to prevent it sagging and touching any surface beneath. The two bars $H^2$ and $H^2$ are connected at their inner ends in rear of the roller $I^2$ by a crossbar $M^2$, and a like bar $N^2$ connects them just in rear of the roller $J^2$.

The ribbon-supporting frame formed of the bars $H^2$ and $H^2$ and their connections is reciprocable backward and forward to place the ribbon at the inner end thereof over the point at which the printing is to be done and to remove it therefrom, the amount of movement given being such that the removal of the ribbon by the outward movement of the parts will expose to view the character printed. It will be seen that the ribbon is doubled at the printing-point, with the result that the wear thereof is prolonged, since obviously two thicknesses will outwear one. As the roller $I^2$ is very small in diameter, the two thicknesses where the doubling occurs lie close together. The movements of the ribbon-carrying frame take place every time a character is printed, and the normal position of said frame when the type-arms are all at rest is with the ribbon retracted from the printing-point. Said frame is hung on the lower ends of a pair of levers $O^2$ and $O^2$, suspended from each of the side plates $D^2$ and $D^2$, one lever of each pair being connected to the outer end of the adjacent bar $H^2$ and the other at or near the mid-length thereof. Said levers are so arranged and their own pivotal points have such relation to their points of connection with the bar $H^2$ that the frame moves downward as it travels inward, so as to place the ribbon close to the paper to be printed on, and upward as the frame moves outward, so as to lift the ribbon away from the surface of the paper.

The levers $O^2$ and $O^2$, that are connected to the two bars $H^2$ and $H^2$ near the mid-lenghs of the latter, are rigidly mounted on the opposite ends of a shaft $o$, journaled to turn freely in openings in the two side plates $D^2$ and D², and being carried above said shaft have their upper ends connected by a cross bar or rod P². The latter is connected by a link Q² with a crank-arm $r^2$ on a rock-shaft R², that is journaled at its ends in bearings attached to the front frame-bars $p^3$ $p^3$ and carries at one end a crank $r^3$, which is connected by a link S² with the lower end of a radial arm $t$, that depends from a transverse rock-shaft T², which is journaled in bearings at the opposite sides of the key-lever-supporting bar P'. Attached to said arm $t$ and to a like arm $t'$ at the other end of the shaft T² is a plate U², that lies beneath the key-levers and is curved concentrically with the bar P'. Projecting from the under side of each key-lever is an arm V², whose lower end is in position to engage the front edge of the plate U² when the key is depressed, and thereby press said plate rearward, and thus through the various connections described rock the levers O² and O² and project the ribbon-carrying frame inward to place the ribbon in position for printing. The crank $r^2$ and link Q² connection between the rock-shaft R² and rod P² is such that when the ribbon is moved to printing position it will remain at rest when it is struck by the type, although the rotation of the rock-shaft R² continues as long as the type is in motion. This is effected by having the type timed to strike the ribbon when the crank $r^2$ reaches such a point in its movement that the shaft-axis, the pivotal connection between the crank and link, and the rod P² are almost in line, and further movement of the crank results merely in rocking the link on its pivotal connection with the rod. The reverse movement of the frame is effected by means of a coiled spring W², that is connected at one end to the rod P² and at its other end to the shaft R². The edge of the plate U⁹ where each key-arm V² engages it is formed straight, so as to afford a fair bearing for the arm upon the same.

Each of the spools C² is provided with a ratchet-wheel X², whose teeth are arranged to cause the spools to revolve in opposite directions, so that after the ribbon has been wound off of one spool it may be rewound on the other. A single pawl-arm Y², having at its end two pawls $y^2$ and $y^2$, adapted the one to work with one ratchet-wheel and the other with the other ratchet-wheel, is pivoted to a lever Z², that is pivoted to a side plate D², and is engaged by a pin or stud on a crank A³, which is mounted on the lever-shaft $o$. Thus the means used to reciprocate the ribbon-carrying frame also serve to actuate the ribbon-feeding mechanism.

Pivotally connected to the pawl-arm Y² is a block B³, to which is pivotally connected one end of a spring-bar C³, whose other end is firmly secured to a rock-shaft D³, that is journaled between the side plates D², parallel with the shaft $o$. The rocking of the shaft D³, by the means to be presently described, through the bar C³ shifts the pawl-arm to disengage one pawl from one ratchet-wheel and to engage the other pawl with the other wheel. As the spring-bar C³ has in itself no tendency to move to one side or the other, but is placed under tension when moved in either direction as by the riding of one pawl or the other over its ratchet-wheel, it serves to hold either pawl yieldingly in engagement with the teeth of its ratchet-wheel.

A stop dog or detent is provided for each ratchet-wheel, the same consisting of two projections $e$ and $e$, one for each wheel, on a pivotal arm E³, that is connected by a link F³ with one end of a spring-bar G³, which is attached at its other end to the rock-shaft D³. The rocking of the latter shifts one dog out of engagement with its wheel and the other into engagement with its wheel, and the spring-bar G³ operates precisely like the spring-bar C³.

The spring-bars C³ and G³ may be fastened to the rock-shaft D³ in any desired way; but a satisfactory way is that shown, where the shaft is split and the ends of the springs are inserted in the split and held by a screw $o'$, that binds the separated parts of the shaft upon them.

Attached to the rock-shaft close to the side plate D², opposite the one near which the ratchet-wheels are placed, is a radially-extending spring-bar H³, that is attached to one end of a bar I³, whose other end is attached to an arm K³, pivoted to a stud $k^3$ on said side plate D². Journaled on said stud is a gear-wheel L³, that meshes with a pinion M³ on the same shaft with the wheel N³, which meshes with and receives motion from a pinion O³ on one of the spool-shafts. The revolution of the spool, whether in one direction or the other, will thus be transmitted to the gear L³. Projecting from the side of the latter is a pin or stud $l$, in whose path as it revolves is the arm $k^3$, and by said stud the latter, on one side or the other, according to the direction of revolution of the gear L³, is adapted to be engaged and moved on its pivot $k^3$ and to thereby move the bar I³. The latter at the point where the spring-bar H³ is attached has an upward extension or arm $i$, that is adapted, according to its movement in one direction or the other, to strike the finger or tail $p^5$ of either of two dogs or detents $p^3$ and $p^3$, pivoted to the side plate D². Said dogs project toward each other and are adapted in succession to respectively engage shoulders $q$ and $q$ on a segment-shaped arm Q³, fastened to the rock-shaft D³, and thus each restrains the latter from movement in one direction. In being moved from one dog-tail to the other the bar extension $i$ is moved toward the dog in engagement with its shoulder $q$ to release the shaft D³ and permit it to turn to shift the engagement of the ratchet-wheel pawls and detents, and as such shaft, by said engagement of the dog and shoulder $q$, is held from turning and as the spring-bar H³ is attached to said shaft the movement of the bar I³ will place said spring-bar under such tension that when the dog is disengaged from its shoulder $q$ the shaft will be rocked by the relaxing of the spring-bar. The latter, like the bars $C^3$ and $G^3$, is placed under tension when bent in either direction, according to the direction of movement of the bar $I^3$ to release a dog. Movement of the shaft by the action of the spring-bar is limited by means of a stop-lug $q'$ on the arm $Q^3$ midway between the two shoulders $q$ and $q$, which strikes against the end of the pawl just released. A single spring $R^3$, fastened at the middle and free at both ends, where it engages both dogs, holds the dogs yieldingly in engagement with their respective shoulders.

Too free rotation of the ribbon-spools is prevented by applying to each a friction device in the form of a coiled spring $S^3$, encircling the spool-shaft and interposed between one side of the spool and the adjacent side plate $D^2$.

It will be understood that the train of gears by which the reversal of feed of the ribbon is effected is timed to the length of the ribbon, the gear $L^3$ being designed to make one revolution while the ribbon is passing from one spool to the other. With different lengths of ribbon the gearing will be changed to produce a rate of revolution of said gear $L^3$ according to the length of ribbon.

Besides the longitudinal feed of the ribbon from one spool to the other I provide for feeding it crosswise. For this purpose the inner ends of the side plates are grooved or formed with guideways that engage the bar $E^2$, so that said plates and all connected parts can be moved laterally along the latter. At or near the longitudinal center of the bar $E^2$ there is attached a nut or threaded block $T^3$, through which passes a screw $U^3$, that is journaled at its opposite ends in the two side plates $D^2$ and $D^2$, and rigidly fixed to said screw near one end is a wheel $V^3$, with notches $v^3$ and $v^6$ in its periphery. Pivoted concentric with the screw is a lever $W^3$, whose free end is in the path of a stud $x$, projecting from the outer side of one of the ratchet-wheels $X^2$, by which stud the lever is engaged and moved in one direction or the other, according to the direction of revolution of the ratchet-wheel. Two levers $Y^3$ and $Y^3$, pivoted to a side plate $D^2$ and normally pulled by a spring $y^3$, that connects them, toward each other and toward a stop-pin $Z^3$, interposed between them, by engaging a pin $w$, projecting from the lever $W^3$, serve, one or the other, to return the lever $W^3$ to the position from which it is moved by the engagement of the wheel-stud $x$, one lever $Y^3$ or the other thus acting according to the direction in which the lever $W^3$ is moved.

Pivoted to the lever $W^3$ is a double-toothed pawl $A^4$, whose teeth are adapted to alternately engage the notches of the wheel $V^3$ and move the latter in opposite directions. A single spring $B^4$, attached to the pawl-lever and adapted to bear successively on opposite sides of an arm $a$, attached to the pawl, serves to hold either pawl-tooth yieldingly in engagement with the wheel-notches. A dog or detent $a'$, engaging the wheel, holds the latter from turning on the slipping of the pawl over the same.

Extending parallel with the screw $U^3$ there are two rods $C^4$ and $C^4$, that are longitudinally movable, their ends being supported in the two side plates to permit such movement, and connecting said rods near their ends are two yoke-plates $D^4$ and $D^4$. Said rods are held at the limits of their movement in opposite directions by two detents or dogs $E^4$ and $E^4$, pivotally attached, respectively, to the side plates $D^2$ and $D^2$ in some suitable manner, a notch being provided in one of the rods for each dog. To each of said rods is attached an arm $F^4$, that projects toward the path traveled by a tail or projection $a^2$ on the pawl $A^4$ when the latter moves with the lever $W^3$, the two arms being in different vertical planes and adapted by the longitudinal movements of the rods to be alternately interposed in such path, so that their ends will be in position to strike the pawl-tail as the pawl-lever swings and cause the rocking of the pawl to shift the engagement of its teeth, and thus reverse the direction of revolution of the screw.

To move the rods longitudinally, so as to remove one arm from and the other into alinement with the pawl-tail, I utilize the nut $T^3$ as an abutment against which on either side, according to the direction of travel of the screw, a coiled spring $G^4$ will be pressed by each yoke-plate $D^4$ and placed under such compression as, when the rod-engaging dog $E^4$ is struck and tripped, as by a projection $H^4$ on the nut, will be sufficient, by pressure on said yoke-plate, to move the rods and connected parts. Thus when the limit of travel in either direction is reached one yoke-plate or the other will press a spring against the side of the nut, and the locking-dog being released the rods will be moved longitudinally and through the placing of the proper arm in alinement with the pawl-tail the direction of revolution of the screw changed, and the ribbon thus started on its movement in the reverse direction. Should the tail of the pawl happen to be in the path of an arm when the rods move, difficulty is avoided by making the arm elastic, so that it will yield when pressed against said tail, and when by the swing of the pawl-lever the pawl-tail is carried out of contact with the arm the end of the latter will spring into the path of the pawl ready to engage the same on the next return movement of the pawl-lever.

The nut $T^3$ is not rigidly fastened to the guide-bar $E^2$, but loosely, so as to allow some play, to enable it to adjust itself to compensate for any irregularities in fitting the parts together. Said bar has a block $I^4$ rigidly secured to it that in its outer side is provided with a vertical groove or slot $i'$, into which extends a tongue or part $K^4$ on the side of the nut. The sides of the groove $i'$ hold the nut from sidewise movement, while a lug $i^2$ from said block $I^4$, engaging the under side of the nut, holds it from turning in one direction, and an overhang $i^3$, caused by cutting the front of said block on an incline inward and downward, engages a corresponding surface on the nut and holds it from turning in the opposite direction.

The entire printing mechanism mounted on the frame X and suspended on wheels from the two bars T and T is moved along the latter after each letter is printed and in spacing words. The source of power for thus moving the mechanism is preferably a spring-drum $L^4$, that is mounted on one of the end bars U and which is connected by a chain or cord $M^4$ to an arm $N^4$, rising from the side of the frame X.

For controlling the feed and causing it to be step by step I employ the following-described mechanism: Mounted, preferably, at the left side of the machine and extending from front to rear is a horizontal shaft $O^4$, upon the front end of which is fastened a pinion $P^4$, that meshes with rack-teeth $Q^4$, formed in the upper edge of the front bar T, which cause the rotation of the pinion as the mechanism is moved along on the bars T and T; also, on said shaft, near its rear end, and placed side by side are two wheels, one, $R^4$, being fixed to the shaft and the other, $S^4$, loose thereon and the periphery of each being provided with a like number of equidistant radial notches. Two reciprocable dogs $T^4$ and $U^4$, that respectively are adapted to be alternately projected into and out of the notches of the wheels $R^4$ and $S^4$ in the form of vertically-arranged bars, are pivotally connected at their upper ends to a lever $V^4$, that is pivoted between its ends. Said dogs, near their lower ends, pass through and are supported and guided by a bracket attached to the rear frame-bar $p^4$. A coiled spring $W^4$, attached at one end to the lever $V^4$ and at its other end to a relatively-fixed point, holds the lever so that the dog $U^4$ is normally in engagement with one of the notches of the loose wheel $S^4$. A curved spring $X^4$, substantially semicircular in form and connected at one end to the wheel $R^4$, that is fixed to the shaft, and at the other end to the loose wheel $S^4$, being placed under tension by the rotation of the fixed wheel when the loose wheel is locked by its dog, acts to rotate said loose wheel when the latter is freed from its dog and the former is locked by its dog. Projecting from the side of the fixed wheel toward the loose wheel is a stud or pin $r^4$, that is in the path of a stud or pin $s$, carried by the loose wheel, and when the latter is rotated by the spring $X^4$ is engaged by said pin $s$ and stops the movement of said loose wheel. A second stud $r^5$ on the fixed wheel, situated so that its movement by the rotation of said wheel is toward the stud $s$ of the loose wheel, is provided to enable said stud $s$ to serve as a stop when the loose wheel is locked by its dog and the fixed wheel is free to limit the rotation of the fixed wheel. The amount of feed permitted by the arrangement of stops just described is one intended for the wide characters; but I also make provision for a shorter feed for narrower characters. For such shorter feed a pin or stud $r^6$ is provided on the fixed wheel, which is adapted to engage a projection $s^2$, carried by the loose wheel, the said stud and projection being relatively arranged, so that less movement of the fixed wheel is required to cause their contact than is the case with the studs $r^4$ and $s$. The projection $s^2$ is the inturned end of a lever $Y^4$, that is pivoted on the outer side of the loose wheel $S^4$, the latter being perforated for the passage of such projection. A spring $Z^4$, attached to said loose wheel, normally holds the lever to keep the projection in position to be engaged by the stud $r^6$, while for removing the projection from such position to allow the longer feed-studs to act a collar $A^5$ is slidingly placed on the shaft $O^4$, that engages the lever $Y^4$, and when moved by means of a lever $B^5$, suitably mounted on the machine-frame and engaging said collar, rocks said lever $Y^4$ and removes its projection $s^2$ from operative position. The end of the lever $B^5$ opposite the collar-engaging end is engaged by one arm of a bell-crank lever $C^5$, that is pivoted to the stud $W'$, the other arm of said lever having projecting on opposite sides lugs or pins $c$ and $c$, that respectively are adapted to be engaged by the under side of a finger-lever $D^5$, also pivoted to said stud $W'$, and the notched-bar-actuating lever $Y'$. The operation of either of these levers $D^5$ and $Y'$ will thus change the feed, the lever $Y'$ being thus used because all of the printing characters brought into action by it are those of greatest width. As certain of the printing characters placed in action by operating the lever $X'$ are also wide ones, I employ a coupling device whereby the depression of the lever $D^5$ may cause the simultaneous depression of said lever $X'$. Said coupling device consists of a sleeve or band $E^5$, encircling the round stem or shank of the lever-key, from which projects horizontally a radial arm $e'$ of such length as to be adapted to extend over said lever $X'$. A coiled spring $F^5$ upon said shank, having one end engaging said arm and the other end a pin $G^5$, passing diametrically through said shank, normally holds the arm in lever-engaging position, an end of the pin $G^5$ serving to so hold the arm in opposition to the pressure of the spring. Said pin also holds the sleeve from longitudinal movement on the key-shank. When it is desired to operate the lever $D^5$ alone, the sleeve $E^5$ is rotated to carry its arm to one side of the key $X'$, so as not to touch the same. A convenient means for thus rotating the sleeve is to attach the key-head $H^5$ thereto and to use said head for turning the same, said head being turned before the lever is depressed, and then held during the depression and until its return to elevated position. A coiled spring $d^8$ pulls the lever $D^5$ in the direction opposite that in which it is moved by the finger.

The reciprocation of the two dogs $T^4$ and $U^4$ is of course caused by the movement of each printing-lever, such movement being produced by connecting the arm $t'$ of the rock-shaft $T^2$ to the lever $V^4$. The latter is provided with a downwardly-extending arm $v^4$, to the lower end of which is connected one end of a two-part jointed link $I^5$, whose other end is pivotally attached to said rock-shaft arm $t'$. Said dogs are also adapted to be operated by a space-bar $K^5$, that extends in front of the key-levers and has rearwardly-extending arms $k^4$ and $k^4$, that are pivoted to the rear frame-bars $p^4$ and $p^4$ at opposite sides of the machine. On the side bar $k^4$, adjacent to the shaft-arm $t'$, is provided a downwardly-extending arm $k^5$, that when the bar $K^5$ is depressed engages a laterally-extending pin $v^5$ on the arm $v^4$ of the lever $V^4$, and thus by moving the latter actuates the dogs $T^4$ and $U^4$. After being depressed the space-bar $K^5$ is returned to normal position by means of a coiled spring secured to one of its arms $k^4$ and to the frame X, its movement under pull of the spring being limited by a stop-lug $k^6$, projecting from an extension of the arm $k^5$, that strikes the adjacent frame-bar $p^4$.

To enable the pinion $P^4$ to be disengaged from the rack $Q^4$, so as to permit the machine to be quickly moved from one side to the other, as when a new line is to be printed, I mount the end of the shaft $O^4$ that is near the pinion in an eccentric $L^5$, that is journaled in an arm projected from an adjacent hanger W, which eccentric is provided with an arm or handle $M^5$, by which the operator may turn it to lift the pinion out of mesh with the rack. A coiled spring $N^5$ turns the eccentric in the opposite direction to reëngage the pinion with the rack and normally maintains such engagement. Suitable stops are provided to limit the throw of the eccentric in both directions.

To stop the sidewise travel of the machine when the end of a line is reached, a stop-finger $O^5$ is placed on the front bar T to the right of the machine, which will be struck by some part of the latter when the limit of travel is reached. Said finger $O^5$ is adjustable to suit lines of various lengths, being mounted on a block $P^5$, that is slidingly mounted on said front bar T, and carries at its end away from the machine a tooth or pawl $Q^5$, that is adapted to engage any one of a series of ratchet-teeth on the upper side of said front bar T. The weight of the block $P^5$ holds the pawl in engagement with a ratchet-tooth, and when it is desired to shift the position of the stop-finger it is necessary simply to lift the block to disengage the pawl and then move it to the desired point and permit it to drop into engagement with another tooth. The block has a lug or lip $p^6$ passed beneath each horizontal flange of the bar T to prevent its being separated from the latter.

No bell or other signal is shown to indicate the approach of the machine to the end of the line, but such can, when desired, be readily employed.

For line-spacing I employ the following-described mechanism: At the side of one of the front boxes V, preferably the left-hand one, I journal on the inwardly-projecting end of a stub-shaft $R^5$ a toothed wheel $S^5$, that meshes with a rack-bar $T^5$, fastened to the plate B parallel with the adjacent end bar U. Pivoted on said shaft $R^5$ is a finger-lever $U^5$, that carries, pivoted to its side, a pawl $V^5$, that is pressed yieldingly by a spring into contact with the teeth of the wheel $S^5$. On the forward movement of said lever the pawl engages with a tooth and revolves the wheel. A coiled spring $W^5$ is provided to move the lever rearward in position for the next operation. Adjacent to said lever $U^5$ an arc-shaped or segmental bar $X^5$ is fastened to the front bar T, which is concentric with the lever and upon which is placed an adjustable stop to limit the throw of the lever and thus the space between lines. Said stop is in the form of a lug or pin $Y^5$, adapted to be engaged by a projection $u$ on the lever and which is placed on a block $Z^5$, that is slidingly mounted on the bar $X^5$, being slotted to receive the latter. A pawl or tooth $z$ on said block, adapted to engage any one of several notches in the outer periphery of the bar and being yieldingly held in such engagement by means of a spring $A^6$, serves to secure the block, and hence the stop-lug, in the desired adjustment.

Pivoted to the rear side of the front bar T is a detent $B^6$, that coöperates with the teeth of the wheel $S^5$ and holds the latter from turning, being pressed yieldingly into engagement with such teeth. On the side of said detent there is formed a lug $b^2$, that is adapted to be engaged by a cam $C^6$ on the finger-lever $U^5$ when the latter is moved forward and the detent thus moved out of engagement with the wheel, so that the latter will be free to be turned by the lever $U^5$. During the movement of the latter that is necessary to disengage the detent the pawl $V^5$ is free from the wheel, this being accomplished by providing the pawl with a tail or prolongation $v^6$, that, on the rearward movement of the lever, strikes against the under side of the bar T and is thereby cammed and held out of engagement with the wheel. On the forward movement of the lever the tail passes out of contact with the bar after the detent $B^6$ has been operated by the cam $C^6$ and the pawl is then thrown into engagement with a wheel-tooth. The detent is provided with a finger-piece by means of which it may be released from the wheel when it is desired to move the machine backward.

To check the too free forward movement of the machine when the pawl-lever $U^5$ is operated, I employ a friction-dog $D^6$, that is pivoted to the side of an end bar U, and has its lower end extended in rear of its pivot and provided with rubber or the like, that bears against the surface of the adjacent rail S, a spring $d^6$ being furnished to normally press said dog into contact with the rail S. At its upper end the dog has a handle or finger-piece placed close to that of the wheel-detent $B^6$, so that both may be conveniently grasped at the same time to release the machine to permit its being moved rearward.

To apply the power equally to both sides of the machine when it is to be moved forward or backward, a cross-shaft $E^6$ extends between and is journaled by the two rear boxes V and V, which has near one end a pinion $F^6$, meshing with the rack-bar $T^5$, and near the other end a pinion $G^6$, that meshes with a rack-bar $H^6$, attached to the plate B on the side opposite that to which the rack-bar $T^5$ is fastened. The rollers $v$ and $v$ in said rear housing V and V are mounted on the shaft $E^6$.

The index I employ to mark the printing-point consists simply of a plate $I^6$, fastened to the front part of the frame X and extending rearward and at its rear end being provided with three pointed lugs $K^6$ and $K^6$, whose extremities converge toward the printing-point. (See Figs. 2 and 4.)

The structure of the top of my machine lends itself readily to the employment of a copy-holder, and such I show applied to the machine. It consists of a light wire frame $L^6$, comprising a short horizontal foot part that is attached at the sides to eyes $M^6$ and $M^6$ on the top of the cross-bar P', and a slightly-inclined vertical part, to the upper edge of which is attached a downwardly and rearwardly curved brace-rod $N^6$, whose lower end is secured in an opening in the rear hanger W. The connection of said rod with the latter is detachable and with the upper edge of the copy-holder is pivotal, and as the connection with the eyes $M^6$ and $M^6$ is a pivotal one the copy-holder can be compactly folded down upon the top of the machine out of the way when not in use.

The manner of using my machine is briefly as follows: With the level of the book-supporting platforms adjusted according to the thickness of the book, so that the open page to be printed on is at the proper height, the type-writer is swung up and rearward on its pivotal connection with the rod C to enable the book to be placed on said platforms. The type-writer, adjusted laterally along the rod to the position required for the page to be printed upon, is now brought down upon the latter, the opposite sides of the leaf being held by the side edges of the opening O in the plate B, the position of the adjustable strip P being made to suit the width of the page being printed on. The printing mechanism being moved to the required position for printing, both in a direction up or down the page and sidewise, the necessary key-levers are manipulated in succession. On the manipulation of each key-lever the ink-ribbon is moved rearward by the connections between the lever and the ribbon-support, heretofore described, and interposed between the paper and the printing character before the arm carrying the latter completes its descent, and before said arm has risen to its position of rest the ink-ribbon is moved forward, thus promptly exposing to view the character printed. Besides thus moving the ribbon the key operated also actuates the escapement mechanism, composed of the two wheels $R^4$ and $S^4$ and their respective detents, so that the printing mechanism is shifted along by the spring-drum to a new printing-point. To bring into action either of the two type characters not normally in printing position, the appropriate lever X' or Y' to actuate the segment-bar F' is operated before the key-lever is operated and held until after the character to be printed has made its imprint. If the longer feed or travel of the printing mechanism is required, then either alone or with the lever X' the lever $D^5$ is actuated to remove and hold the wheel stop or projection $s^2$ out of operative position. Manipulation of the space-bar $K^5$ produces the requisite spacing between words. A line having been printed, the printing mechanism is adjusted to print a succeeding line by means of the feed-lever $U^5$.

While I prefer the details of construction shown and described, it is to be understood that I do not limit myself thereto, nor do I limit myself to the use in such an organization as that shown and described of those features which are capable of use alone or in an organization that in the entirety may differ from mine.

Having thus described my invention, what I claim is—

1. In combination with a type-writer, a suitable support for the surface to be printed on, a support on which the type-writer is movably mounted, parallel rack-bars on said support, a shaft connected with the type-writer, having a pinion meshing with each rack-bar, and a third pinion connected with the type-writer, and meshing with one of said racks, and means to actuate said pinion, substantially as and for the purpose specified.

2. In combination with a type-writer, a suitable support for the surface to be printed on, a support on which the type-writer is movably mounted, parallel rack-bars on said support, a shaft connected with the type-writer, having a pinion meshing with each rack-bar, a third pinion, connected with the type-writer, and meshing with one of said racks, and a hand-lever for actuating said pinion, substantially as and for the purpose set forth.

3. In combination with a type-writer, a suitable support for the surface to be printed on, a swinging plate, ways or guides on the plate, on which the type-writer is mounted, a pair of rack-bars on the plate, a shaft connected with the type-writer and having a pinion meshing with each rack-bar, a third pinion meshing with one rack-bar, means whereby said third pinion may be rotated, and means for preventing it from rotating, substantially as and for the purpose described.

4. In combination with a type-writer, a suitable support for the surface to be printed on, a plate having an opening, sides of which rest on the latter, and a strip adjustably placed in said opening, forming one side thereof, with an under surface in the same plane with the under surface of the plate, substantially as and for the purpose specified.

5. In combination with a type-writer, a suitable support for the surface to be printed on, a plate having an opening, sides of which rest on the latter, and a strip adjustably placed in said opening, forming one side thereof, and having its ends slidingly engaging the edges of the plate, substantially as and for the purpose set forth.

6. In combination with a type-writer, a suitable support for the surface to be printed on, a plate having an opening, sides of which rest on the latter, and a strip adjustably placed in said opening, forming one side thereof, and having its ends beveled downward and inward to engage corresponding surfaces on the edges of the plate, substantially as and for the purpose described.

7. The combination of two vertically-movable platforms, a pair of rock-shafts connected to each platform, crank-arms on said shafts, connections between the arms of each pair of shafts, and an adjustable connection between the two pairs of shafts, substantially as and for the purpose described.

8. The combination of two vertically-movable platforms, a pair of rock-shafts connected to each platform, connections between the arms of each pair of shafts, and a turnbuckle connecting the two pairs of shafts, substantially as and for the purpose described.

9. In combination with a type-arm, a bracket to which the same is pivoted that is composed of a rigid arm and a spring that are, respectively, on opposite sides of the arm, and lie parallel with the normal line of movement of the type-arm, substantially as and for the purpose specified.

10. In combination with a type-bar, a support to which the same is pivoted having a spring-plate pressing against the side of the bar, substantially as and for the purpose described.

11. In combination with a type-bar, a bracket to which the same is pivoted, that is composed of a rigid arm and a spring-plate that are respectively on opposite sides of the bar, substantially as and for the purpose set forth.

12. In combination with a pivoted type-arm, a head carrying a plurality of type adapted for successive use, a pivoted cam, constructed to move with the type-arm and relative to which the type-arm is movable, a movable plate to engage and stop the cam, in its movement with the arm, and means adapted to be acted on by the cam, to cause movement of the type-carrying head, substantially as and for the purpose shown.

13. In combination with a pivoted type-arm, a head carrying a plurality of type adapted for successive use, a pivoted cam, a lever pivoted to the arm, adapted to coöperate with the cam, means for imparting motion of said lever to the type-carrying head, and a movable plate to engage and stop the cam in its movement with the arm, substantially as and for the purpose specified.

14. In combination with a pivoted type-arm, a head carrying a plurality of type adapted for successive use, a pivoted cam having a number of projections, one less than the number of type, a lever pivoted to the arm adapted to coöperate with the cam projections, means for imparting the motion of said lever to the type-carrying head, and a movable plate having a number of projections to engage the cam, corresponding with the number of the cam projections, substantially as and for the purpose described.

15. In combination with a pivoted type-arm, a head carrying a plurality of type adapted for successive use, a pivoted cam for actuating said head, a part carried by the arm to engage and move the cam in one direction, means for limiting such movement of the cam, and a part connected with said arm to engage and move the cam in the opposite direction, substantially as and for the purpose set forth.

16. In combination with a pivoted type-arm, a head carrying a plurality of type adapted for successive use, a pivoted cam for actuating said head, a part carried by the arm to engage and move the cam in one direction, a part connected with said arm to engage and move the cam in the opposite direction, and means whereby movement of the cam by each of said parts may be limited, substantially as and for the purpose shown.

17. In combination with a pivoted type-arm, a head carrying a plurality of type adapted for successive use, a pivoted cam for actuating said head, means to cause the cam to operate said head, and a rod connected to the arm, by which the latter may be moved, adapted to engage and move the cam, substantially as and for the purpose specified.

18. In combination with a pivoted type-arm, a head carrying a plurality of type adapted for successive use, a lever pivoted to said arm, for moving the head in one direction, a pivoted cam engaging said lever, means for stopping movement of the cam at predetermined points, and a key-actuated rod connected to the type-arm, and adapted to engage the cam, substantially as and for the purpose described.

19. In combination with a pivoted type-arm, a head carrying a plurality of type adapted for successive use, a lever pivoted to said arm for moving the head in one direction, a spring for moving it in the opposite direction, a pivoted cam engaging said lever, a movable plate for engaging the cam, and a key-actuated rod connected to the type-arm, and adapted to engage the cam, substantially as and for the purpose set forth.

20. In combination with a pivoted type-arm, a head carrying a plurality of type adapted for successive use, a cam for actuating said head, a sleeve on which said cam is pivoted, encircling the type-arm pivot, and engaging said arm, and a spring holding the sleeve against the type-arm, substantially as and for the purpose shown.

21. In combination with the type-actuating mechanism of a type-writer, an ink-ribbon, a pawl-and-ratchet feed mechanism, a reciprocable frame on which the ribbon is placed, pivoted bars supporting said frame, a shaft on which said bars are placed, and a connection between said shaft and the pawl of the feed mechanism, substantially as and for the purpose specified.

22. In combination with the type-actuating mechanism of a type-writer, an ink-ribbon, a pawl-and-ratchet feed mechanism, a reciprocable frame on which the ribbon is placed, pivoted bars supporting said frame, a shaft on which said bars are placed, an arm on said shaft, a lever to which the pawl of the feed mechanism is attached, and a connection between said lever and arm, substantially as and for the purpose set forth.

23. In combination with a pivoted part, a bar that is elastic and flexes, laterally, and connected with such part, and means for moving the bar to swing said part in opposite directions, said bar holding such part yieldingly in either of the positions to which it is moved, substantially as and for the purpose described.

24. In combination with two ratchet-wheels, a double-pawl-carrying arm, a spring-bar connected with said arm, and means for actuating said bar, to change the pawl engagement from one wheel to the other, said spring-bar serving to yieldingly hold each pawl in contact with its wheel, substantially as and for the purpose set forth.

25. In combination with two ratchet-wheels, a double-pawl-carrying arm, a spring-bar connected with said arm, a rock-shaft to which said bar is fastened, and means to turn said shaft to move said bar, to change the pawl engagement from one wheel to the other, said spring-bar serving to yieldingly hold each pawl in contact with its wheel, substantially as and for the purpose shown.

26. In combination with two ratchet-wheels, a double-pawl-carrying arm, a spring-bar connected with said arm, a rock-shaft to which said bar is fastened, a second spring-bar attached to said shaft, and means whereby said bar may be moved alternately in opposite directions, and placed under tension, to cause the turning of the rock-shaft, substantially as and for the purpose specified.

27. In combination with oppositely-moving feed mechanisms adapted for alternate movement, a rock-shaft adapted to be turned to render said mechanisms alternately operative, an arm on said shaft, two oppositely-acting dogs to alternately engage shoulders on said arm, a spring-bar connected to the rock-shaft, and means whereby said bar may be alternately moved in opposite directions and one dog or the other released, substantially as and for the purpose described.

28. In combination with two ribbon-spools, a toothed wheel for each spool, an arm carrying two pawls adapted to be moved to render one pawl or the other operative on its wheel, and gearing, receiving motion from one of the spools, for moving said arm, substantially as and for the purpose set forth.

29. In combination with two ribbon-spools, a feed mechanism for each spool, and means to cause one mechanism or the other to become operative, comprising in part a pin mounted on a wheel geared to one of said spools, and an arm in the path of the pin, that is engaged and moved thereby when said wheel revolves in one direction, to cause one feed mechanism to be operative, and the other inoperative, and is engaged and moved by the pin when the wheel revolves in the reverse direction, to cause the reversal of the conditions of the feed mechanism, substantially as and for the purpose specified.

30. In combination with two ribbon-spools, a feed mechanism for each spool, and means to cause one mechanism or the other to become operative, comprising in part a pin mounted on a wheel, geared to one of said spools, an arm in the path of the pin, a lever connected to said arm, a rock-shaft to which the lever is connected, and connections between the shaft and the feed mechanism, substantially as and for the purpose set forth.

31. In combination with two ribbon-spools, a feed mechanism for each spool, a rock-shaft adapted by its movements, to cause one mechanism or the other to become operative, an arm on said shaft, two oppositely-acting dogs to alternately engage shoulders on said arm, a spring-bar connected to the rock-shaft, a lever connected to said bar adapted to alternately engage said dogs, to release them, and gearing, receiving motion from one of the spools, for operating said lever, substantially as and for the purpose shown.

32. In combination with mechanism for longitudinally feeding a ribbon, a frame carrying said mechanism and means operated by said mechanism for moving the frame to produce a lateral feed of the ribbon, substantially as and for the purpose described.

33. In combination with mechanism for longitudinally feeding a ribbon, a frame carrying said mechanism, a screw and nut for moving said frame to produce lateral feed of the ribbon, and means actuated by the longitudinal feed mechanism, for operating the screw, substantially as and for the purpose set forth.

34. In combination with two ribbon-spools, a feed-wheel on one of the spools, means for rotating said wheel, a projection on said wheel, a laterally-feeding mechanism for the ribbon, and a lever in the path of the wheel projection for operating said laterally-feeding mechanism, substantially as and for the purpose specified.

35. In a feed mechanism, the combination of a nut, a screw, a double-pawl-carrying lever, means for actuating said lever, oppositely-extending arms, or projections, adapted to be alternately placed in the path of movement of the double pawl, and means for moving said arms, substantially as and for the purpose described.

36. In a feed mechanism, the combination of a nut, a screw, a double-pawl-carrying lever, means for actuating said lever, two, connected, longitudinally-movable rods carrying each an arm, and means for moving said rods to alternately place their arms in the path of movement of the double pawl, substantially as and for the purpose set forth.

37. In a feed mechanism, the combination of a nut, a screw, a double-pawl-carrying lever, means for actuating said lever, longitudinally-movable rods carrying each an arm, springs for moving said rods in opposite directions, whereby one arm or the other may be placed in the path of movement of the double pawl, dogs adapted to successively hold the rods, means for releasing the rod-engaging dogs, and means for alternately placing the springs under tension, substantially as and for the purpose shown.

38. In combination with two ribbon-spools, oppositely-acting feed-wheels for said spools, whereby the ribbon may be alternately fed longitudinally in opposite directions, a mechanism for feeding the ribbon laterally, and a lever for operating the lateral feed mechanism actuated from one of said feed-wheels, in whichever direction it may rotate, substantially as and for the purpose specified.

39. In combination with two ribbon-spools, oppositely-acting feed-wheels for said spools, whereby the ribbon may be alternately fed longitudinally in opposite directions, a mechanism for feeding the ribbon laterally, a lever for operating the lateral feed mechanism actuated from one of said feed-wheels in whichever direction it may rotate, and spring-actuated levers situated to act alternately on opposite sides of said lever, substantially as and for the purpose described.

40. In a feed-controlling mechanism for type-writers, the combination of a shaft, two notched wheels, respectively, fast and loose thereon, a dog for each wheel, means for rotating the shaft, a spring connecting the two wheels, coöperating projections from the two wheels, and means to alternately engage and disengage the dogs and wheels, substantially as and for the purpose set forth.

41. In a feed-controlling mechanism for type-writers, the combination of a shaft, two notched wheels, respectively, fast and loose thereon, a dog for each wheel, means for rotating the shaft, a spring connecting the two wheels, a projection from one wheel adapted to coöperate with a projection from the other wheel, and means for withdrawing one of said projections from coöperative position, substantially as and for the purpose shown.

42. In a feed-controlling mechanism for type-writers, the combination of a shaft, two notched wheels, respectively, fast and loose thereon, a dog for each wheel, means for rotating the shaft, a spring connecting the two wheels, coöperating projections, fixed to the two wheels, and other coöperating projections, one of which is movable to permit its removal from coöperative position with the other, substantially as and for the purpose specified.

43. In a feed-controlling mechanism for type-writers, the combination of a shaft, two notched wheels, respectively, fast and loose thereon, a dog for each wheel, means for rotating the shaft, a spring connecting the two wheels, a projection from one wheel adapted to coöperate with a projection from the other wheel, a lever pivoted to one of the wheels, which carries one of said projections and means for moving said lever, substantially as and for the purpose described.

44. In a type-writer, the combination of the type-actuating levers, a space-lever, a feed-controlling mechanism, a lever to which two dogs forming part of said controlling mechanism, are connected, a rock-shaft adapted to be actuated by the type-actuating levers, connections between the same and said dog-lever, and an arm on the space-lever to engage a part of the dog-lever, substantially as and for the purpose set forth.

45. In a type-writer, the combination of the type-actuating levers, a space-lever, a feed-controlling mechanism, a lever to which two dogs forming part of said controlling mechanism are connected, a rock-shaft adapted to be actuated by the type-actuating levers, a link connecting an arm of said shaft with the dog-lever, and a part carried by the space-lever, to engage a part of the dog-lever, substantially as and for the purpose shown.

46. In a type-writer, the combination of the type-actuating levers, a space-lever, a feed-controlling mechanism, a lever to which two dogs forming part of said controlling mechanism are connected, a rock-shaft adapted to be actuated by the type-actuating levers, a two-part link connecting an arm of said shaft with the dog-lever, and a part carried by the space-lever to engage a part of the dog-lever, substantially as and for the purpose set forth.

47. In a type-writer, the combination of mechanism for bringing any one of several type on a common part, to printing position, a feed-controlling mechanism constructed to feed different distances, a lever for each of said mechanisms, capable of operation independently of each other and means whereby one may be caused to operate the other, substantially as and for the purpose specified.

48. In a type-writer, the combination of a part carrying several type, mechanism for moving said part to place any of the type in printing position, a feed-controlling mechanism constructed to feed different distances, and a lever common to both mechanisms for changing the type to print, and altering the feed, substantially as and for the purpose described.

49. In a type-writer, the combination of mechanism for bringing any one of several type on a common part, to printing position, a feed-controlling mechanism, constructed to feed different distances, a lever for actuating each of said mechanisms, a pivoted arm carried by one of said levers, and means whereby said arm may be moved into and out of position to engage the other lever, substantially as and for the purpose set forth.

50. In a type-writer, the combination of two levers, a mechanism operated by each, a pivoted arm on one lever, a spring holding said arm yieldingly in position to engage the other lever, and a head connected to said arm by which it may be turned in opposition to the spring, substantially as and for the purpose shown.

51. In a feed mechanism for type-writers, the combination of a toothed wheel, a lever carrying a pawl adapted for coöperation with said wheel, a detent or dog for the latter, a dog-releasing device carried by the lever and movable thereby into and out of engagement with the dog, and means for disengaging the lever-pawl from the wheel, and to hold it disengaged, while the dog is being released, substantially as and for the purpose set forth.

52. In a feed mechanism for type-writers, the combination of a toothed wheel, a lever carrying a pawl adapted for coöperation with said wheel, a curved arm whose curvature is concentric with the lever-axis, and an adjustable lever-stop on said arm, substantially as and for the purpose shown.

53. In a feed mechanism for type-writers, the combination of the part to be moved, guide bars or rails therefor, and a friction device to retard such movement that is normally in acting position, substantially as and for the purpose specified.

54. In a feed mechanism for type-writers, the combination of the part to be moved, guide bars or rails therefor, and a friction-dog carried by said part normally engaging one of said bars or rails, substantially as and for the purpose described.

55. In a feed mechanism for type-writers, the combination of two fixed rack-bars, a pinion on the part to be moved, meshing with a rack-bar, means to rotate said pinion, a shaft carried by the part to be moved, and pinions thereon meshing with each rack-bar, substantially as and for the purpose shown.

56. In combination with a type-writer mounted on a traveling frame, guide-bars for said frame, two fixed racks, a pinion on said frame meshing with one of the racks, a means to rotate the pinion, a shaft on the frame, and pinions on said shaft meshing with each rack, substantially as and for the purpose specified.

In testimony that I claim the foregoing I have hereunto set my hand this 29th day of April, 1897.

WILLIAM B. HOPKINS.

Witnesses:
FRANK P. PRINDLE,
CHAS. J. WILLIAMSON.